May 14, 1957     O. BARTHRUFF     2,791,934

FILM RUNNING INDICATOR FOR MOTION PICTURE CAMERAS

Filed March 31, 1953

INVENTOR
Otto Barthruff
by
Stevens, Davis, Miller & Mosher
his attorneys

United States Patent Office 2,791,934
Patented May 14, 1957

2,791,934

FILM RUNNING INDICATOR FOR MOTION PICTURE CAMERAS

Otto Barthruff, Stuttgart, Germany, assignor to Eugen Bauer G. m. b. H., Stuttgart-Unterturkheim, Germany Application March 31, 1953, Serial No. 345,969

Claims priority, application Germany April 28, 1952

2 Claims. (Cl. 88—16)

The invention relates to a motion picture camera with a film running indicator. It is known to drive film running indicators from the motive means of the camera. Such indicators certainly count exactly in conformity with the feeding mechanism, but they also count in excess when the film becomes torn or is exhausted. They, therefore, do not indicate accurately, when the camera is in use, if film is being moved continually through the film gate and whether the scene desired is in fact being exposed on moving film.

There are also running indicators known which are controlled by contact members disposed on the film strips and come into action only when the film is exhausted or torn at the point of the contact. However, they do not indicate whether the film is running and what quantity of unexposed film is still available.

It is an object of this invention to remove the disadvantages of these known devices by imparting to the indicator elements movement derived from the film in such a way that only the moving film moves the elements. It may, therefore, be ascertained whether film is available for exposure and is being correctly fed. Suitable construction of the driving gear enables determination from the indicator of the amount of unexposed film which is still available.

The invention will be further described with reference to an embodiment taken by way of example and illustrated diagrammatically in the accompanying drawings.

Figure 1:
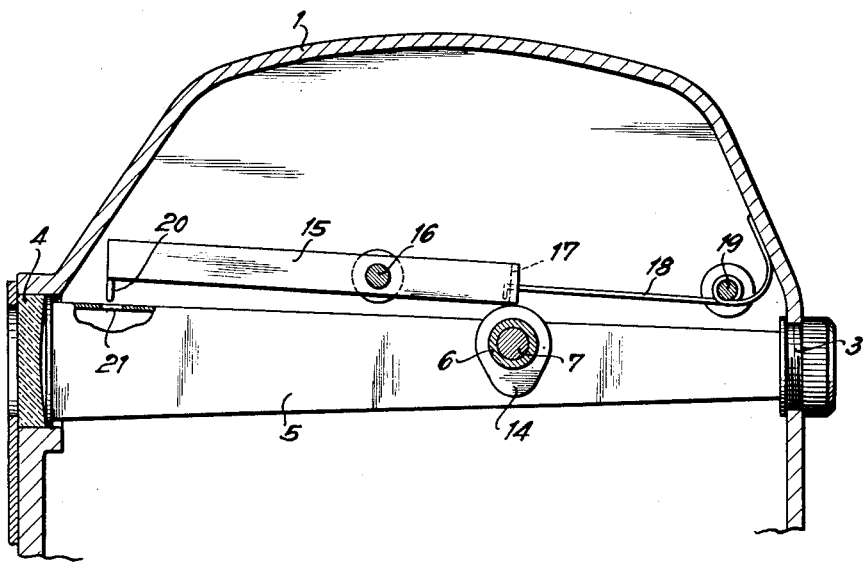
Fig. 1 is an elevation in part section of parts of a motion picture camera.
Figure 2:
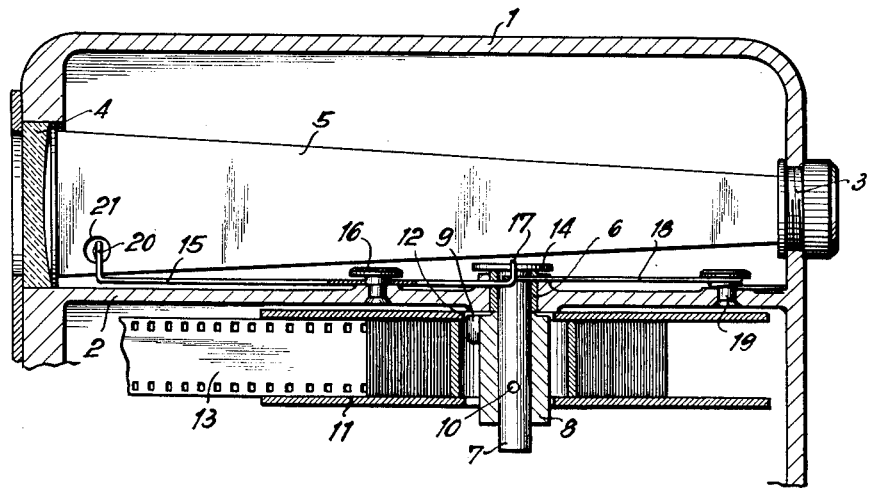
Fig. 2 is a section of the arrangement.

A casing 1 of the motion picture camera contains a partition 2. Parallel to this wall a view finder is arranged with an inlet sighting aperture 3, and an outlet sighting aperture 4 and a tube 5 connecting these two apertures.

A spindle 7 is journalled in a bearing bush 6 seated in the partition 2. The spindle 7 carries a bush 8 with a nose-like projection 9. Bush 8 and spindle 7 are connected by a pin 10. The bush 8 is adapted to receive a film spool 11 which has recesses 12 directed inwardly towards the axis of the spool and the nose-like projection 9 engages in one of these recesses. The film spool 11 carries unexposed film 13.

The end of the spindle 7 projecting out of the bearing bush 6 at the side of the view finder carries a cam disc 14.

A lever 15 is mounted by a bolt 16 on the partition 2. The end 17 of the lever 15, seen on the right looking at Fig. 1, is right-angular and slides on the cam 14. This end is pressed against the cam disc by a wire spring 18 which is secured by a bolt 19 to the partition 2 and bears with its free end against the casing 1.

The left-hand end of the lever 15 carries a downwardly turned point 20. The latter is disposed to be capable of projecting through an aperture 21 in the tube 5 of the view finder into its field of vision when the lever is raised by the cam disc 14.

Before photographing, a spool 11 with unexposed film is mounted on the bush 8 and the film inserted into the exposing and feeding devices (not shown in the drawing) of the camera. During the exposure the film is drawn off the film spool 11 at uniform speed and the spool is thereby rotated. The spool engages the bush 8 through the recess 12 and the nose-like projection 9, and the bush 8 engages the spindle 7 through the pin 10. The cam disc 14 disposed on the spindle 7 consequently rotates and sets the lever 15 into oscillating motion. As the photographer in the meantime scans the scene through the view finder, he sees the point 20 of the lever 15 appearing in his field of vision intermittently; he therefore, knows that the film is running correctly.

Initially, the film spool 11 is full, the film 13 unwinds from a large diameter and the film spool, as also the cam disc 14, rotate comparatively slowly. As more film is used, this rotation becomes faster and the more frequently does the point 20 appear in the field of vision. From this difference in speed which is clearly discernable may be judged directly the quantity of film still on the film spool 11.

The cam disc may be profiled to cause more than one lift per revolution. The driving gear of the indicator elements may be derived from another member, instead of the feeding film spool, which is driven by the moving film, for example, a sprocket. Instead of an indicator appearing periodically, alternatively an indicating means, for example a disc, may project permanently into the field of vision of the view finder and indicate running of the film by its rotary motion.

I claim:

1. In a motion picture camera, a casing provided with a partition defining a first compartment for a film strip and a second compartment for a view finder affording the camera operator a defined field of vision, a spindle rotatably mounted in and extending through the partition, one end portion of the spindle being disposed in the first compartment and adapted to receive a spool of film attached in driving connection thereto, the other end portion of the spindle being disposed in the second compartment and having a cam fixedly circumposed thereon and disposed in the second compartment parallel to the partition, a lever pivotally mounted for swinging movement on the partition parallel thereto, spring means connected between the lever on one side of the pivot and the casing for holding the lever in following engagement with the cam and means on the lever on the other side of the pivot adapted to reciprocatingly project into the field of vision with each rotational movement of the cam, said spring means opposing the swinging movement of the lever caused by the cam, said means on the lever being movable at all times in the same path and at a rate of speed which varies with the rate of rotational speed of the spool of film.

2. In a motion picture camera, a casing provided with a partition defining a first compartment for a film strip and a second compartment for a view finder affording the camera operator a defined field of vision, a spindle rotatably mounted in and extending through the partition, one end portion of the spindle being disposed in the first compartment and adapted to receive a spool of film attached in driving connection thereto, the other end portion of the spindle being disposed in the second compartment and having a cam fixedly circumposed thereon and disposed in the second compartment parallel to the partition, a lever pivotally mounted for swinging movement on the partition parallel thereto, spring means connected between the lever on one side of the pivot and the casing for holding the lever in following engagement with the cam and means on the lever on the other side of the pivot adapted to reciprocatingly project into the field of vision with each rotational movement of the cam, said spring means opposing the swinging movement of the lever caused by the cam, said means on the lever being movable at all times in the same path and at a rate of speed which varies with the rate of rotational speed of the spool of film, and said lever being substantially flat and lying alongside the partition and said means thereon including a lateral offset on one end and the lever contacting the cam at the other end thereof.

References Cited in the file of this patent

UNITED STATES PATENTS

| | | |
|---|---|---|
| 1,881,903 | Owens | Oct. 11, 1932 |
| 1,979,984 | Moomaw | Nov. 6, 1934 |
| 2,392,212 | Zuber | Jan. 1, 1946 |
| 2,433,908 | Jackson | Jan. 6, 1948 |

FOREIGN PATENTS

| | | |
|---|---|---|
| 236,398 | Switzerland | Feb. 15, 1945 |